United States Patent [19]
Mageren et al.

[11] Patent Number: 5,732,962
[45] Date of Patent: Mar. 31, 1998

[54] CENTRIFUGAL VEHICLE SUSPENSION SYSTEM PROVIDING WEIGHT TRANSFER ONTO THE INNER WHEELS

[76] Inventors: Jean-Pierre Mageren, 6 rue Infante Isabelle B-7180, Seneffe; Claude Mageren, 55 rue Hanoteau B-6060, Gilly, both of Belgium

[21] Appl. No.: 666,333
[22] PCT Filed: Jan. 5, 1995
[86] PCT No.: PCT/BE95/00001
  § 371 Date: Jun. 20, 1996
  § 102(e) Date: Jun. 20, 1996
[87] PCT Pub. No.: WO95/18737
  PCT Pub. Date: Jul. 13, 1995
[30] Foreign Application Priority Data Jan. 6, 1994 [BE] Belgium .................................. 9400012

[51] Int. Cl.$^6$ .......................... B60G 21/10; B62D 24/00
[52] U.S. Cl. ........................ 280/111; 280/112.2; 280/772
[58] Field of Search ............................ 280/112.2, 772, 280/689, 112.1, 111

[56] References Cited

U.S. PATENT DOCUMENTS

| 1,402,625 | 1/1922 | Laughlin | 280/111 |
| 2,791,440 | 5/1957 | Guidobaldi | 280/112.2 |
| 4,550,926 | 11/1985 | MacIsaac | 280/112.2 |

FOREIGN PATENT DOCUMENTS

| 730095 | 4/1932 | France | 280/111 |
| 1102445 | 10/1955 | France | 280/111 |
| 570108 | 2/1933 | Germany | 280/112.2 |

*Primary Examiner*—Peter C. English
*Attorney, Agent, or Firm*—Leonard Bloom

[57] ABSTRACT

A vehicle suspension system including a suspension cradle and a body with a fulcrum which is moved sideways relative to the cradle by the centrifugal force, towards the inner wheel, so that the load is shifted onto the inner wheel, the centre of gravity of the vehicle body being located beneath the fulcrum.

3 Claims, 4 Drawing Sheets

CENTRIFUGAL VEHICLE SUSPENSION SYSTEM PROVIDING WEIGHT TRANSFER ONTO THE INNER WHEELS

FIELD OF THE INVENTION

The present invention relates to a mechanism allowing a weight transfer onto the inner wheel(s) of a cornering vehicle, so as to delay substantially the point of overturning.

DESCRIPTION OF THE RELATED ART

Presently, only systems for stabilizing the body without transfer of the weight onto the inner wheel(s) are used.

For the stabilisation of the vehicle, various manufacturers use torsion bars, hydropneumatic suspension or active suspension (Formula I).

The system with a torsion bar will avoid body movements and will limit the collapse of the suspension of the outer wheel without achieving a weight transfer onto the inner wheel.

Regarding the hydropneumatic suspension, this will allow a hardening of the suspension for the outer wheel in order to avoid the collapse of the suspension of the outer wheel. This however is achieved without resulting in a weight transfer onto the inner wheel.

Active suspension used in Formula I is intended to avoid the movements of the body. However no spring is employed so that this suspension is very uncomfortable. The use thereof was forbidden in 1993. In addition, there is no guarantee of a good ground adherence.

According to the European application No 0 538 608 filed by Porsche Mass transfer, there is a transfer of the mass located in the structure of the body but this system is intended for the damping of the vibrations of the body.

According to the patent application DE-B-1 214 100, the rotation movement of the body on the cradle under the influence of the centrifugal force slants the wheels in order to assure an improved adherence. The inclination of the wheels causes an abnormal wearing of the tyres or necessitates the use of motorcycle tyres with a consequent reduction in adherence.

As shown in FIGS. 1 and 7 of DE-B-1 214 100, the movement of the body is a pendulum or swinging movement along an arc of a circle having the center located above the center of gravity and the body being located beneath the center of gravity.

The rotation of the body on the cradle shifts the center of gravity towards the outer wheel. The system of the application DE-B-1214 100 does not allow the transfer onto the inner wheels and it is not the desired result.

None of these systems provide an efficient solution to the problem of the lifting of the inner wheel nor to the problem of improving the safety of a cornering vehicle. The load on the suspension or on the tyres is not reduced.

With presently known traditional suspensions, the vehicles exhibit a tendency to slant in bends. This effect is due to the centrifugal force and is dependent on the gauge and on the position of the center of gravity relative to the ground level. The resulting force of the centrifugal force and the weight of the vehicle, leads to a loading on the outer wheel and an unloading on the inner wheel. The overturning takes place when the resultant is located exterior to the outer wheel.

The purpose of the present invention is to overcome these disadvantages and to provide an efficient solution which is easy to materialize without a large increase of cost. In addition, the invention allows the use of all suspension systems.

SUMMARY OF THE INVENTION

The above required result is reached by the use of a system able to load the inner wheel of a cornering vehicle.

According to the present invention, the proposed system is adapted for vehicles with one or several wheel pairs and is characterized by the mobility of the body, without any horizontal sliding, on a suspension cradle. In addition, the fulcrum of the body on the cradle is located above the center of gravity of the body. The sideway tilting of the body allows the transfer of a portion of the weight onto the inner wheel.

DETAILED DESCRIPTION OF THE INVENTION

Figure 1:
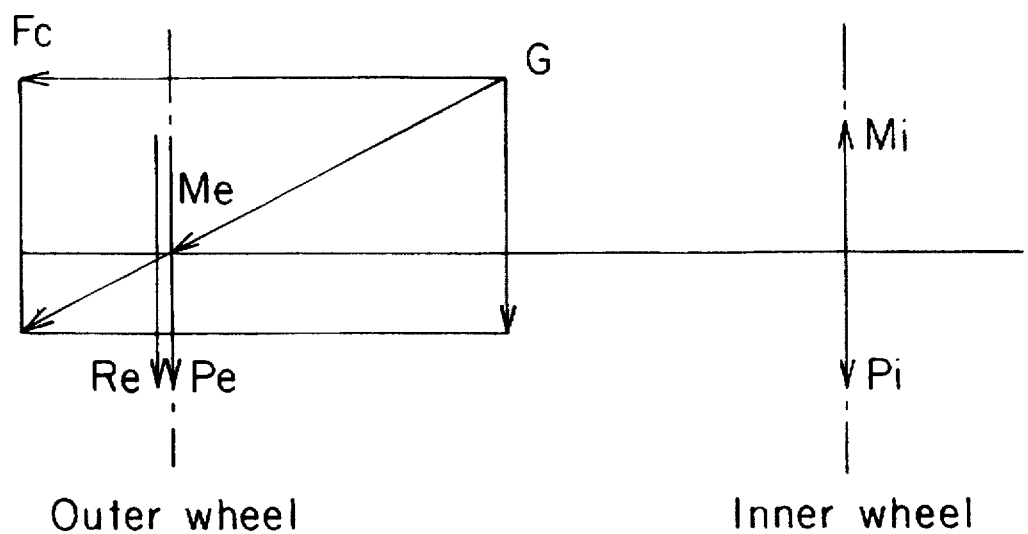
FIG. 1 is a force diagram illustrating the suspension for a traditional vehicle.

The force diagram of FIG. 1 illustrates the centre of gravity G, the centrifugal force Fc, the weights on the inner and outer wheels (respectively Pi, Pe) and the overturning force on the inner wheel (Mi) and outer wheel (Me). The overturning takes place when the resultant Re is located exterior to the outer wheels.

Figure 2A:
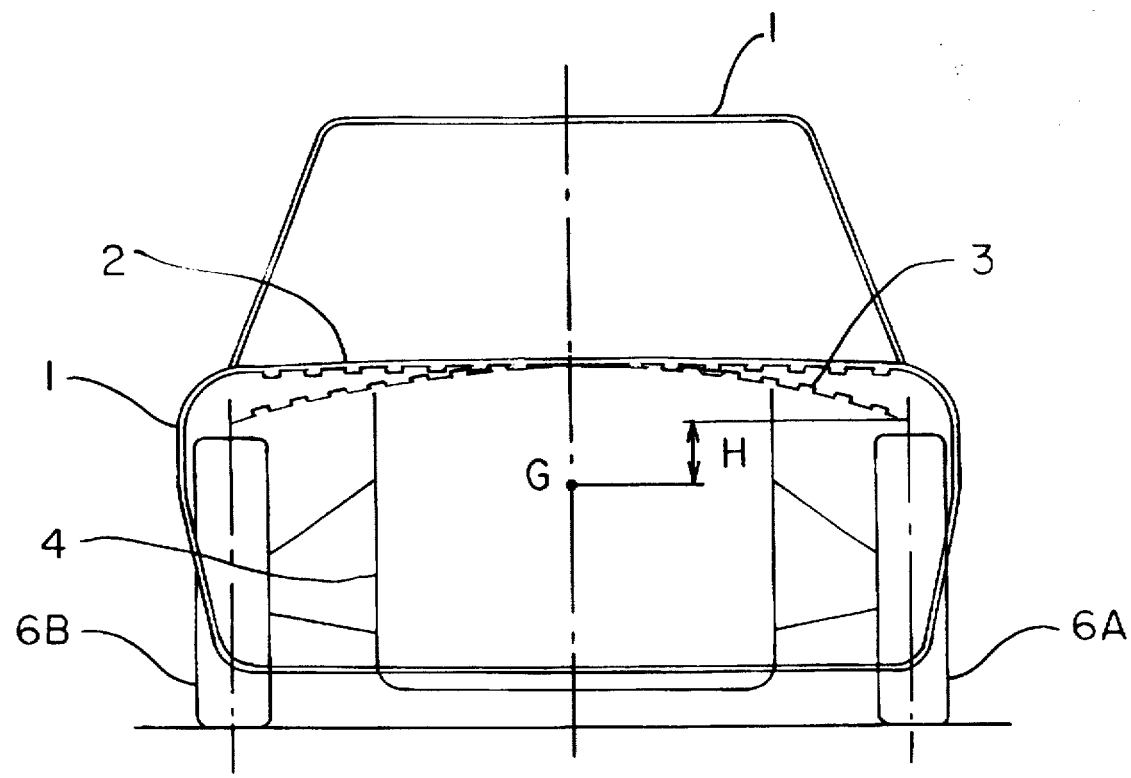
FIGS. 2a and 2b are sectional views of a vehicle in a straight line and a vehicle cornering respectively, the vehicle being adapted with a suspension system according to the invention.
Figure 2B:
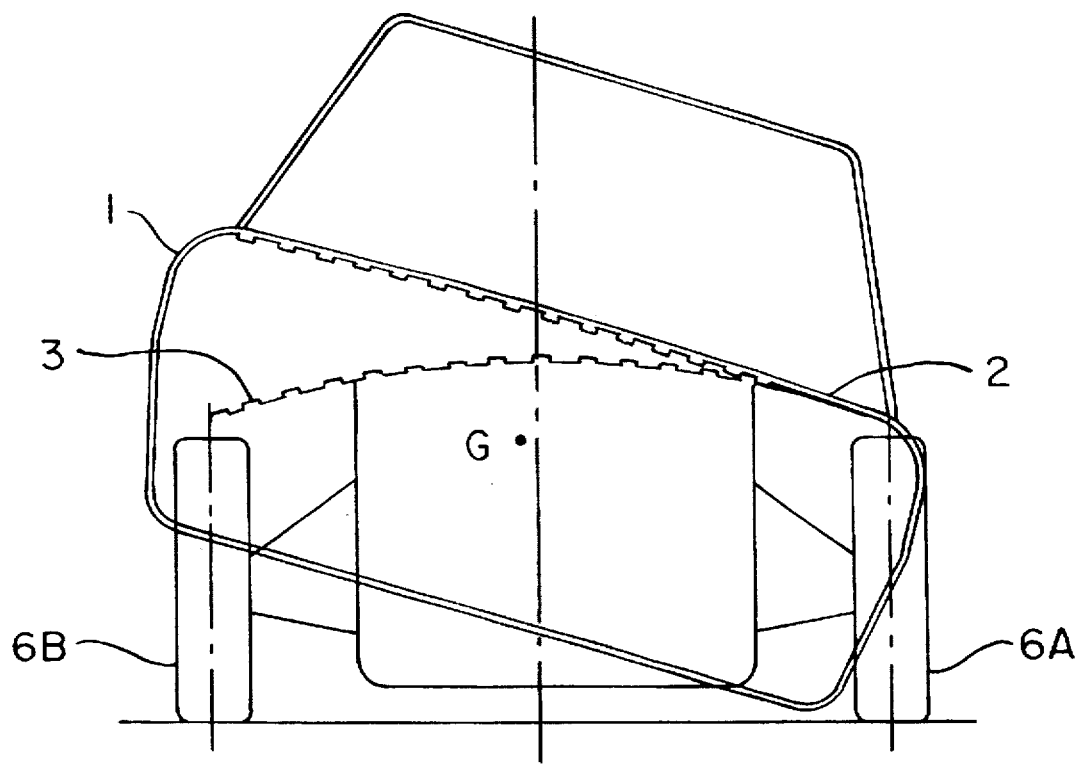

FIGS. 2a and 2b illustrates the suspension system according to the invention, in the cases of a vehicle in a straight line (FIG. 2a) or cornering (FIG. 2b).

The cradle of the mentioned suspension comprises a chassis 4, the wheels 6a, 6b, the traditional suspension not shown and the cradle 3 itself whereon the body 1 will move.

The body 1 comprises the body-building, the engine as well as the passengers and the loading (not illustrated).

The center of gravity G of the body is located beneath the cradle 3 at a distance H.

Figure 3:
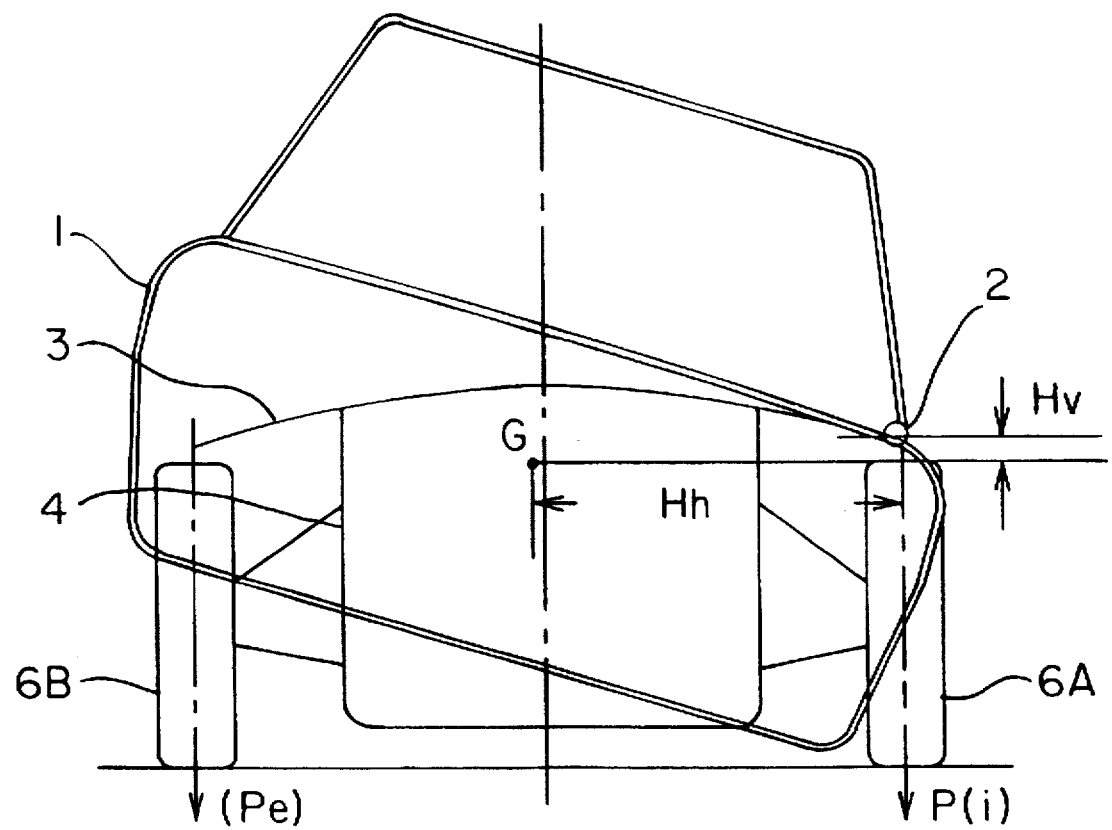
FIG. 3 shows in more detail the distribution of the weight with respect of FIG. 2b.

According to the present invention the fulcrum 2 of the body 1 will shift under the influence of the centrifugal force from its initial position towards the inner wheel 6a, modifying in that way the distribution of the weight on the wheels. This is illustrated in more detail in FIG. 3, where there is shown the distribution of the weight of the different elements when the contact point is at the end.

When the body has the fulcrum 2 above the inner wheel 6a, the following distribution will result: weight on the outer wheel (Pe)=½ weight of the cradle; weight on the inner wheel (Pi)=½ weight of the cradle 3+the total weight of the body.

The movement of the body is governed by the following equation:

$$\text{Weight of the body} \times Hh = \text{Centrifugal force} \times Hv \quad (1)$$

Hh is the horizontal distance between the center of gravity of the body and the fulcrum of the body on the cradle and Hv is the vertical distance between the center of gravity of the body and the contact point of the body and the cradle.

The movement of the body is dependent on the centrifugal force, and Hh increases with the centrifugal force while Hv decreases with this force. The weight may be considered as a constant.

According to equation (1), equilibrium is dependent on the centrifugal force. When the body is in equilibrium for a given centrifugal force, the weight of the body is transferred to the contact point. When the contact point is at a maximum shift, the weight of the body is transferred at a maximum amplitude onto the inner wheel.

A practical embodiment according to the present invention comprises a chassis connecting rigidly the front and rear cradles of a vehicle having two pairs of wheels. The front and rear cradles are each topped by a curved toothed rack with a shape dependent on the required result (comfort, stability). The body also comprises two toothed racks of shape differing from the ones of the cradles but with teeth of the same module. The body rests on the corresponding racks of the cradle, the difference in shape of the lower and upper racks allowing the shifting of the fulcrum of the body on the cradle towards the inner wheel. The fulcrum must always be located above the center of gravity of the body even during its displacement. This means that the value of Hv in equation (1) must always be positive.

According to another embodiment to be mentioned as an example, the toothed racks are replaced by damped elastic bindings which will prevent any transversal displacement, such bindings being located between the curvature of the body and of the cradle. The toothed racks may also be replaced by hydraulic or hydropneumatic systems.

Figure 4A:
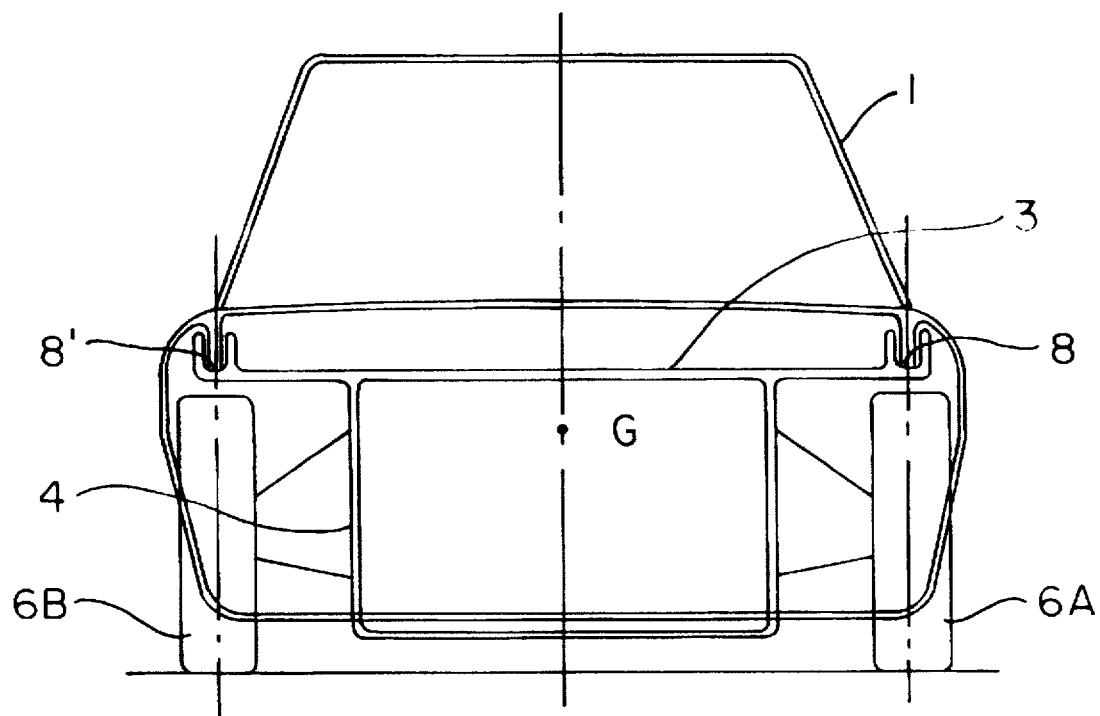
FIGS. 4a and 4b are sectional views of a vehicle in a straight line and a vehicle cornering respectively, the vehicle being adapted with another embodiment of a suspension system according to the invention.
Figure 4B:
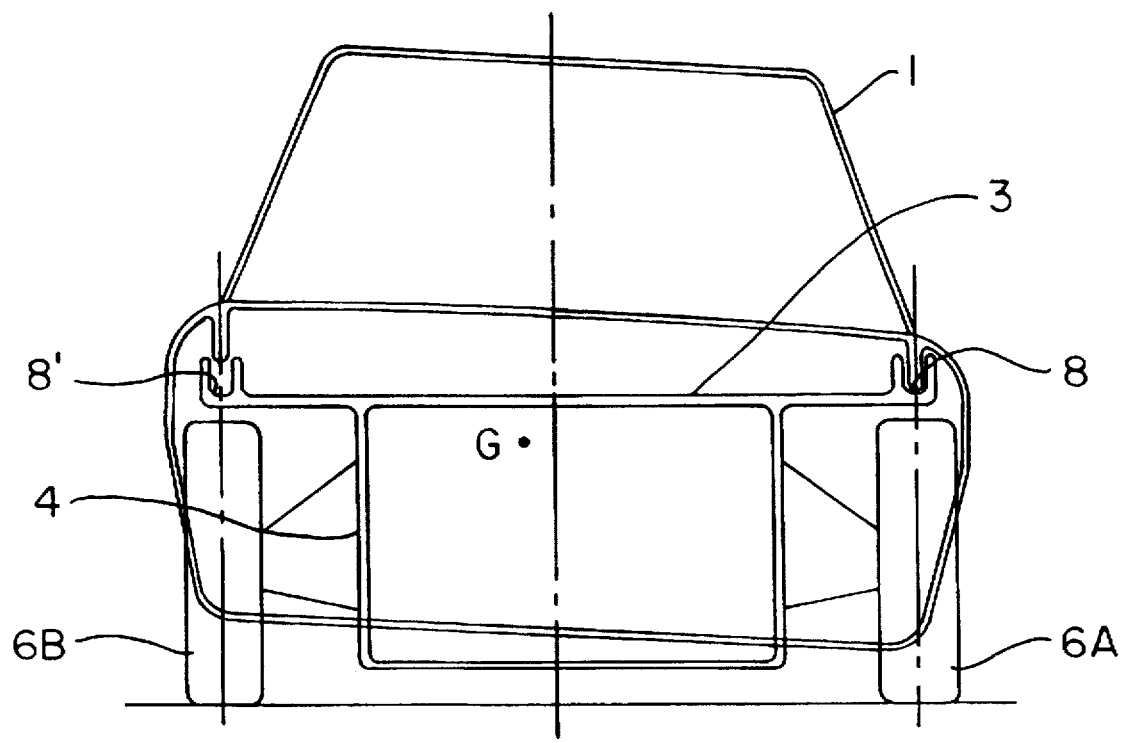

Still another embodiment is illustrated in FIGS. 4a and 4b. This embodiment consists of a system where the body 1 rests on the external ends 8, 8' of the cradle 3 allowing the lifting of the body on the side of the outer wheel 6b and allowing the transfer of the weight of the body 1 onto the inner wheel 6a. The magnitude of the lifting must be limited by damped elastic bindings, or by a hydraulic or hydropneumatic system (not shown). The center of gravity G is moved up and displaced towards the outer wheel 6b.

The benefit obtained with a centrifugal suspension system according to the present invention is illustrated in Table 1.

For example, the following particular case may be contemplated: weight of the vehicle=500 kg; weight of the body=350 kg; weight of the cradle=150 kg; velocity=115 km/h; radius of curvature=50 m; gauge=1.60 m; location of the center of gravity relative to the ground=0.40 m for the cradle and 0.50 m for the body.

It is observed from the following table that, for a traditional vehicle, the resultant on the inner wheel is 0 kg, and 500 kg on the outer wheel while in the case of a centrifugal suspension, the weights are respectively 130 kg and 370 kg. The resulting benefit is an increase of 20% on the velocity. The percentage of benefit is a constant which is independent of the radius of curvature. The benefit will rise when the ratio of weight of the body: weight of the cradle increases. The inner wheel will be advantageously loaded if the velocity increases.

TABLE I

COMPARISON TABLE OF DIAGRAM FORCES

| SUSPENSION TYPE | | TRADITIONAL | CENTRIFUGAL | | |
|---|---|---|---|---|---|
| | | | BODY | CRADLE | TOTAL |
| Weight of the vehicle | Kg | 500 | | | 500 |
| Weight of the body | Kg | | 350 | | |
| Weight of the cradle | Kg | | | 150 | |
| Velocity | Km/h | 115 | 155 | 115 | 115 |
| Radius of curvature | m | 50 | 50 | 50 | 50 |
| Gauge | m | 1.60 | 1.60 | 1.60 | 1.60 |
| Location of the center of gravity vs ground | m | 0.40 | 0.50 | 0.40 | |
| Centrifugal force (Fc) | Kg | 1000 | 700 | 300 | |
| Weight on the inner wheel (Pi) | Kg | 250 | 350 | 75 | 425 |
| Weight on the outer wheel (Pe) | Kg | 230 | 0 | 75 | 75 |
| Overturning force on the inner wheel (Mi) | Kg | −250 | −220 | −75 | −295 |
| Overturning force on the outer wheel (Me) | Kg | +250 | +220 | +75 | +295 |
| Resultant on the inner wheel (Ri)u = Pi + Mi | Kg | 0 | 130 | 0 | 130 |
| Resultant on the outer wheel (Re) = Pe + Me | Kg | 500 | 220 | 150 | 370 |

We claim:

1. Suspension system for a vehicle with at least one pair of wheels, the pair having an inner wheel and an outer wheel when the vehicle is cornering and submitted to a centrifugal force, comprising at least a curved suspension cradle and a body, said body having a fulcrum over said cradle, . which is sideway mobile relative to the suspension cradle, characterized in that the body shifts its fulcrum sideways under the influence of the centrifugal force, relative to the suspension cradle towards the inner wheel, and that the center of gravity of the body is located beneath the fulcrum.

2. Suspension system according to claim 1, characterized in that the fulcrum between the body and the cradle moves on curvatures under the influence of the centrifugal force.

3. Suspension system according to claim 1 characterized in that the fulcrum is constituted by two toothed racks, of identical module, of different curvatures and secured respectively to the body and to the cradle.

* * * * *

UNITED STATES PATENT AND TRADEMARK OFFICE
CERTIFICATE OF CORRECTION

PATENT NO. : 5,732,962
DATED : March 31, 1998
INVENTOR(S) : Mageren et al

It is certified that error appears in the above-indentified patent and that said Letters Patent is hereby corrected as shown below:

COLUMN 4:

Table 1, column "TRADITIONAL", line 10, "230" should read ---250---.

Table 1, column "BODY", line 4, "155" should read ---115---.

Table 1, column "TOTAL", line 8, there is no entry, the entry should be ---1000---.

Signed and Sealed this

Seventh Day of July, 1998

*Attest:*

BRUCE LEHMAN

*Attesting Officer*     *Commissioner of Patents and Trademarks*